Aug. 26, 1952 G. B. HILL 2,608,153
DISCHARGE END CONTRACTING DEVICE FOR BALERS
Filed Oct. 12, 1946 3 Sheets-Sheet 1

INVENTOR
GEORGE B. HILL
BY
ATTORNEYS

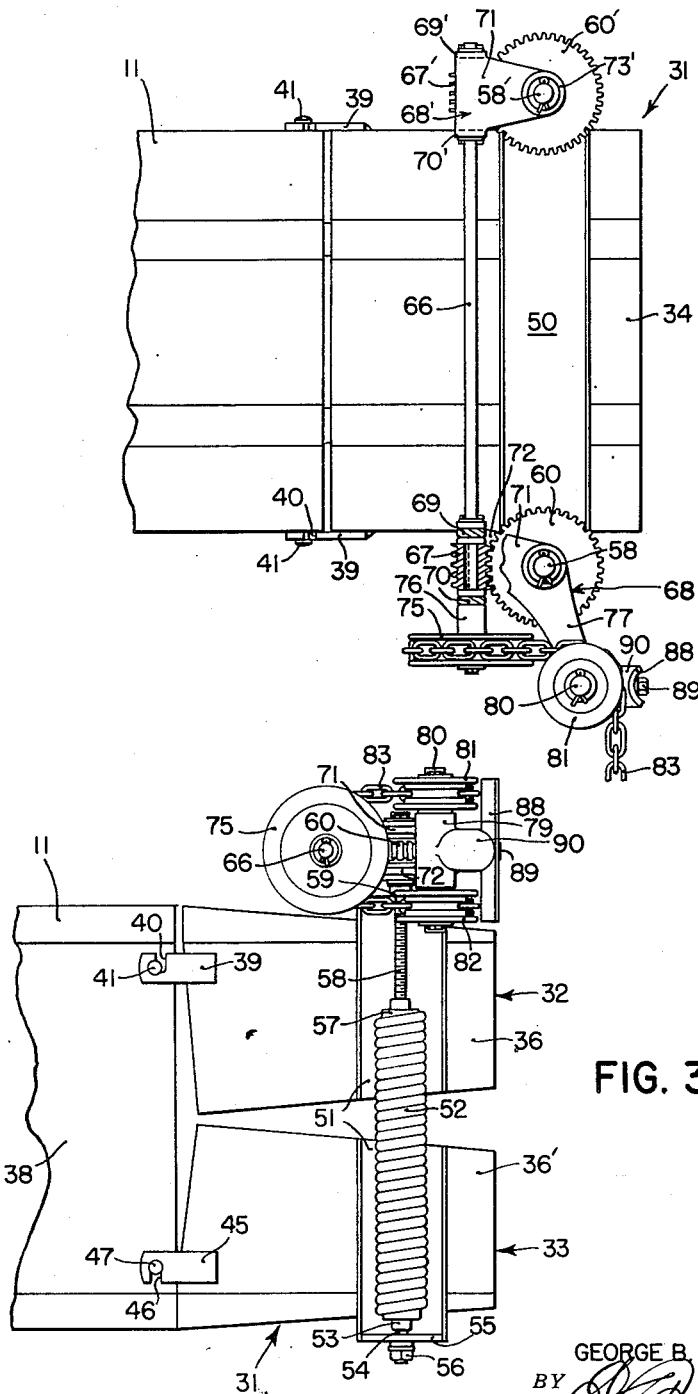

Aug. 26, 1952             G. B. HILL             2,608,153
DISCHARGE END CONTRACTING DEVICE FOR BALERS
Filed Oct. 12, 1946             3 Sheets-Sheet 3
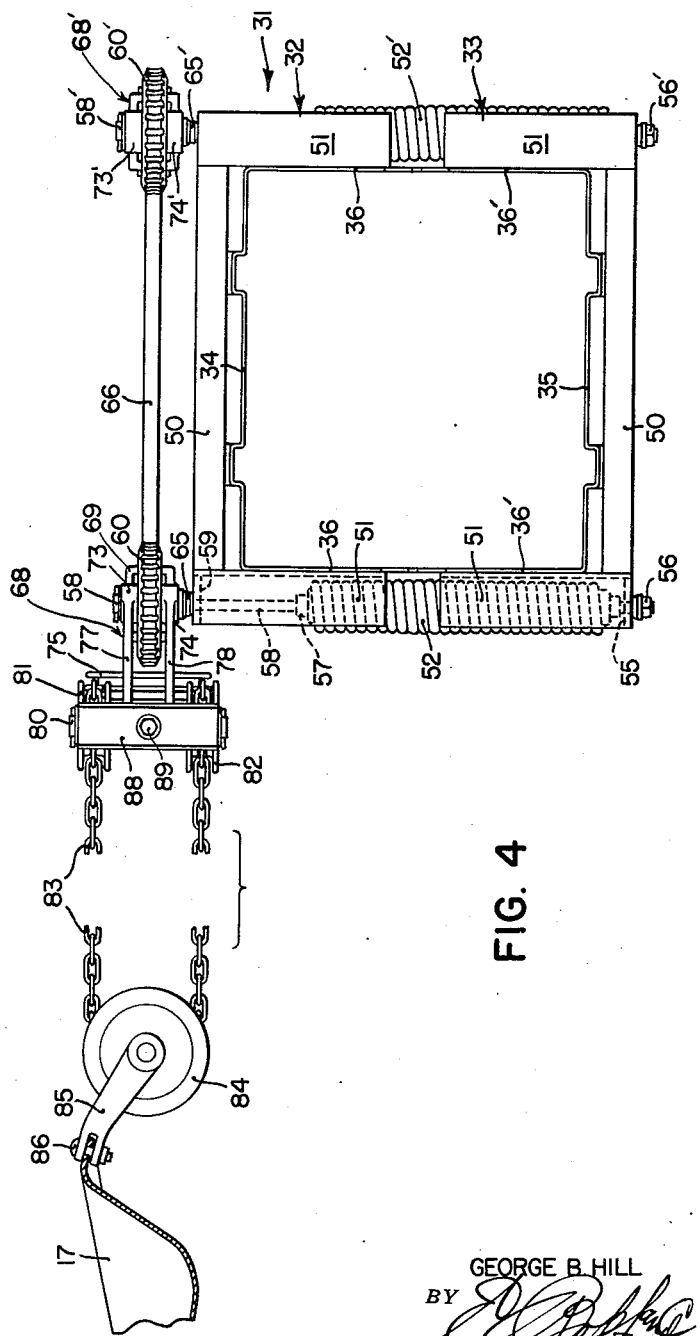
FIG. 4
INVENTOR
GEORGE B. HILL
BY 
ATTORNEYS Patented Aug. 26, 1952

2,608,153

UNITED STATES PATENT OFFICE 2,608,153

DISCHARGE END CONTRACTING DEVICE FOR BALERS

George B. Hill, Ottumwa, Iowa, assignor to Deere Manufacturing Co., a corporation of Iowa Application October 12, 1946, Serial No. 702,908

8 Claims. (Cl. 100—192)

The present invention relates generally to baling presses and more particularly to mechanism for applying pressure to the opposing walls of the bale case to provide a resistance to the movement of the bales of crops therethrough, and thus to determine the density to which the bales are packed during the baling operation.

The principal object of the present invention relates to the provision of novel and improved means for applying pressure to the opposing walls of the bale case, which is more satisfactory in operation under varying crop conditions and which provides bales of greater uniformity, but without a proportionate increase in complexity and cost.

In tractor drawn baling presses of the type in which the bale case is disposed transversely of the direction of travel of the implement, as disclosed in United States Patent No. 2,484,890 to George B. Hill, the length of the bale case is necessarily appreciably shorter than the more conventional type of bale case which is disposed longitudinally of the direction of travel. Inasmuch as the frictional resistance to movement of the bales through the case is inherently less in the shorter cases, it is necessary to provide mechanical means for increasing frictional resistance in order to produce bales of satisfactory density, since the pressure at which the crop is packed into the bales is dependent upon the frictional resistance of the bale case to movement of the bales through the baling chamber. This additional friction is provided by an adjustable bale case extension, comprising a pair of opposing walls which are pivotally mounted on the bale case at the discharge end thereof by means which provides for movement of the opposing walls toward and away from each other, and means for urging the walls toward each other to compress the bales.

Still another object relates to the provision of force exerting mechanism for urging the opposing walls of the bale case extension toward each other with a force which is substantially constant regardless of variations in the distance between the opposing walls. This is desirable to accommodate unevenness in the sides of the bales of hay or other crops in order to provide a substantially constant frictional resistance to movement thereof. It is also desirable that the opposing walls do not move apart to positions in which they inflexibly resist any further movement, for when the walls reach such inflexible positions, the bale case can become jammed until the baling pressure exceeds a reasonable limit.

In order to equalize the pressure along the opposing walls by providing at least two spaced pressure transmitting connections through which force is exerted to urge the opposing walls toward each other, it is also conventional to provide means for adjusting the amount of pressure applied by the force transmitting means to the sides of the hay bales. It is a further object of the invention to provide a single control device for adjusting the pressure transmitting devices simultaneously and to equal extent, in order that the amount of pressure exerted along the sides of the bale is maintained substantially uniformly.

A still further object relates to the provision of control mechanism for simultaneously controlling the pressure exerting devices of a baling press of the tractor-operated, automatic, one-man-controlled type, the control mechanism extending to a position on the baling press within reach of the operator from his station on the tractor. It is well known to those skilled in the art that the frictional resistance of the hay bales in the baling chamber varies widely with the crop conditions and especially with the amount of moisture in the baled crops. For example, when the baling work is begun in the morning, the hay is frequently damp enough to have a substantial moisture content, and therefore in order to prevent packing the hay too tightly in the bales it is necessary to loosen the pressure exerting devices at the discharge end of the bale case. Later, as the hay dries out, the frictional resistance of the hay bales against the bale case decreases, and if no adjustment were made the bales would be packed too loosely. Thus, by providing control means convenient to the operator of the tractor, the pressure upon the bales can be gradually adjusted from time to time, without the necessity for the operator to stop the tractor and walk back to make adjustment of the pressure exerting mechanism on the bale case, resulting in an appreciable increase in efficiency of operation. Furthermore, there will be less variation in the weight of the bales, for the ease of adjusting the bale case pressure will encourage the operator to make frequent adjustments as moisture and other crop conditions change during the day.

These and other objects and advantages of the present invention will be apparent to those skilled in the art after a consideration of the following description, in which reference is had to the drawings appended hereto, in which:

Figure 2 is a fragmentary top plan view, partly in section, and drawn to an enlarged scale, showing the discharge end of the bale case and embodying a modified form of the remote control element;

Figure 3 is a side elevational view of the device shown in Figure 2; and

Figure 4 is an end elevational view.

Figure 1:
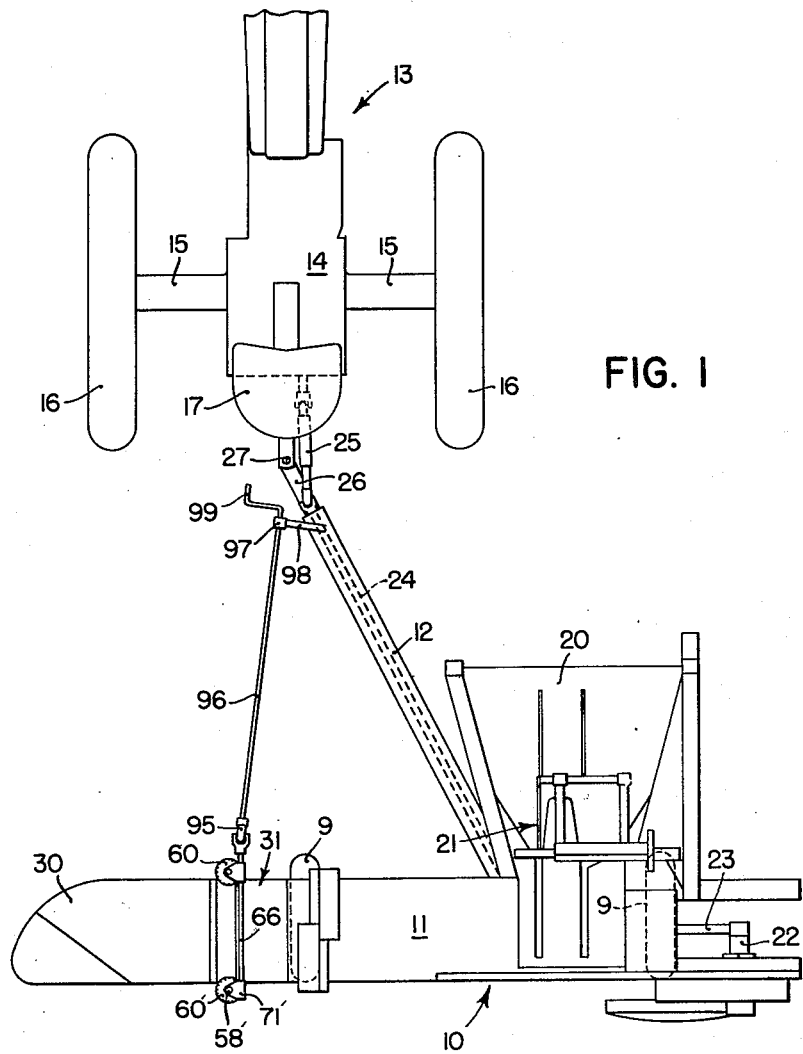
Figure 1 is a top plan view of a tractor operated baling press embodying the principles of the present invention.

Referring now to the drawings, the baling press is indicated in its entirety by reference numeral 10 and is of the general type disclosed in the above mentioned Hill patent. The press 10 comprises a transversely disposed bale case 11 carried on suitable supporting wheels 9 and is provided with a forwardly and laterally inclined draft member 12, which is connected to the bale case 11 at the rear end and extends to a suitable draft connection on the rear end of a tractor 13. The tractor 13 comprises a longitudinally extending body portion 14 carried on a pair of laterally extending axle housings 15 supported on a pair of laterally spaced rear traction wheels 16. The rear end portion of the body 14 is provided with an operator's station in the usual manner, including an operator's seat 17.

The baling press 10 is provided with a forwardly extending harvester platform 20 which is mounted on the front of the bale case 11 spaced laterally from the plane of the adjacent tractor wheel 16, and has suitable conventional mechanism (not shown) for picking up a windrow of harvested hay or other crop and delivering it rearwardly into a feeder mechanism 21 which feeds the crops into the baling chamber, in which a plunger is reciprocated by a suitable drive mechanism including a crank shaft 22 and a connecting rod 23. The crank shaft 22 is rotated by a suitable drive mechanism deriving power from a power shaft 24 extending through the draft member 12 which is in the form of a tubular member as shown and described in application, Serial No. 594,685, filed May 19, 1945 by Miles H. Tuft, now Patent No. 2,499,615. The forward end of the tubular member 12 terminates rearwardly of the tractor 13 and the power shaft 24 projects forwardly from the end of the tubular member and is connected by a conventional flexible power shaft connection 25 to the power takeoff shaft of the tractor. The tubular draft member 12 is connected by means of a tongue 26 to a pivot connection 27 on the rear of the tractor body 14, the tongue 26 being mounted at its rear end on the lower side of the tubular draft member 12.

The details of the tractor and baling press are not fully shown and described herein since they form no essential part of the present invention. It will be understood that in this preferred embodiment, the baling press is provided with any suitable automatic tying mechanism, such as that disclosed in the above mentioned Hill patent.

During the baling operation, the crops are packed in the bale case 11 by the plunger in a manner well known to those skilled in the art, forcing the crops laterally through the bale case 11, and after the bales are tied they are discharged laterally outwardly over a discharge table 30, from which the completed bales drop to the ground.

The discharge end of the bale case 11 is provided with a bale case extension 31 comprising a pair of opposed upper and lower sections 32, 33, each of which includes a generally horizontal wall portion 34, 35 formed of heavy sheet metal and having a pair of laterally spaced vertically extending side flanges 36' turned at right angles thereto. The upper section 32 is disposed with the generally horizontal wall portion 34 in alignment with the top wall of the bale case 11 and serving as an extension thereof, while the side flange portions 36 of the upper section 32 are disposed substantially in the vertical planes of the side walls 38 of the bale case 11. The upper portion 32 is supported on the bale case 11 by means of a pair of ears 39, which are fixed, as by welding, to the side flanges 36, respectively, and extend therefrom alongside the side walls 38 of the bale case. The ears 39 are provided with L-shaped slots 40 which extend downwardly from the upper edges of the ears 39 and receive a pair of studs 41, fixed to the side walls 38 of the bale case, respectively, as best shown in Figure 3.

Similarly, the lower extension member 33 is disposed with its generally horizontal wall portion 35 substantially in the plane of the bottom wall of the bale case 11 and the upwardly extending side flanges 36' are disposed substantially in the planes of the side walls 38 of the bale case, respectively, and serve as extensions thereof. A pair of ears 45 are fixed, as by welding, to the side flange portions 36', respectively, and extend therefrom along the sides of the side walls 38, respectively. The ears 45 are provided with slots 46 extending upwardly from the lower edges thereof for receiving studs 47, which are rigidly fixed to the side walls 38 of the bale case 11, respectively.

Each of the extension members 32, 33 is provided with a structural channel frame comprising a generally horizontally disposed channel section 50 extending transversely across the horizontal wall portion 34 or 35 and a pair of generally vertically disposed channel sections 51 rigidly fixed to the side flange portions 36, or 36', respectively, and secured to the ends of the transverse channel portion 50.

Thus it will be evident that the bale case extension 31 comprises a pair of opposed sections which are swingably connected to the bale case 11 by the studs 41, 47, which provide for swinging movement of the generally horizontal walls 34, 35 toward and away from each other. On each side of the extension, the upper and lower vertically disposed flanges 36, 36' lie in a common plane and the adjacent edges are spaced apart sufficiently vertically to permit a substantial amount of pivotal movement of the upper and lower sections 32, 33. The extension members are readily removable from the end of the bale case 11 to reduce the overall length of the latter by unhooking the supporting ears 39, 45 from the studs 41, 47, respectively, thereby sliding the studs out of the slots 40, 46, respectively.

The extension members 32, 33 are urged toward each other by a pair of long helical springs 52, 52' disposed along opposite sides of the bale case extension 31, within the structural channel members 51, respectively. Each of the springs 52, 52' is stressed in tension to swing the extension members 32, 33 toward each other about the axes of the pivot studs 41, 47, respectively. The lower end of the tension spring 52 is provided with a threaded connector 53, which is attached to a threaded stud 54 extending downwardly through an end plate 55, the latter being rigidly fixed, as by welding, to the lower end of the channel member 51 between the side flanges of the latter. A nut 56 is threaded on the lower end of the stud 54 beneath the end plate 55 and anchors the lower end of the spring 52 to the lower extension member 33. The upper end of the spring 52 is provided with a threaded collar 57 which receives a vertical threaded shaft 58 which extends upwardly through a suitable aperture in an upper end plate 59 rigidly fixed, as by welding, at the upper end of the channel member 51 on the upper extension member 32. The shaft 58 extends upwardly beyond the end plate 59 and a worm gear 60 is keyed to the upper portion of the shaft 58 above the upper extension member 32. A thrust bearing 65 is disposed on the shaft 58 above the plate 59 and bears against the top surface of the latter. It is evident that by turning the gear 60 in one direction about the axis of the shaft 58, the latter is rotated within the threaded collar 57 pulling the collar 57 and upper end of the spring 52 upwardly, thereby increasing the tension in the spring. Conversely, when the gear 60 is turned in the opposite direction, the tension in the spring 52 is decreased. Thus, by rotating the worm gear 60, the amount of force tending to urge the upper and lower wall portions 34, 35 toward each other can be controlled, thereby controlling the amount of frictional resistance of the walls 34, 35 to movement of the hay bales outwardly through the bale case extension 31. The spring 52' is arranged and adjusted in a similar manner and has parts corresponding in structure and function to those just described for the spring 52, certain of these parts being visible at 56', 58', 60' and 65' in Figures 1, 2 and 4. The effect of this adjustment is to adjust the amount of pressure exerted by the baling plunger when packing hay or other crops into the bale.

It will be understood by those skilled in the art that when making adjustments of the spring pressure between the two extension members 32, 33, it is necessary or desirable to adjust both of the tension springs 52, 52' in order to maintain a balanced pressure across the width of the bales in order to maintain a uniform density in all parts of the bales of crops. Thus, it is desirable to simultaneously rotate the two shafts 58, 58' on opposite sides of the extension 31, and this is accomplished by providing a mechanical interconnection between the two shafts 58, 58' causing them to rotate simultaneously.

The mechanical connection in this embodiment of the invention comprises a transversely disposed power transmitting shaft 66 having a pair of laterally spaced worm elements 67, 67' keyed to the shaft 66 and disposed in meshing relation with the worm gears 60, 60', respectively. Each of the worms 67, 67' is partially enclosed within a bearing bracket casting 68, 68' which is provided with a pair of hubs 69, 69', 70, 70' embracing the shaft 66 on opposite sides of the worm elements 67, 67', respectively. The hubs 69, 70 are formed integrally with a pair of upper and lower bracket arms 71, 72, which extend above and below the worm gear 60, respectively, and are provided with hump portions 73, 74 journaled on the vertical shaft 58 above and below the worm gear 60. A control wheel in the form of a sheave 75 is provided with a hub 76 which is keyed at one end of the shaft 66.

Hence, by rotating the control wheel 75, the shaft 66 and the two worm elements 67, 67' are rotated to drive the two worm gears 60, 60' simultaneously, thus adjusting the tension in the two springs 52, 52' simultaneously in the same direction.

On the forward side of the bale case the bearing bracket casting 71 is provided with a pair of forwardly extending arms 77, 78, which are integrally connected to a vertically disposed hub 79 in which is journaled a vertical shaft 80. A pair of sheaves 81, 82 are journaled on the shaft 80 above and below the hub 79, respectively, and are independently rotatable on the shaft 80. A flexible element in the form of an endless chain 83 is trained around the sheave 75 and the two upper and lower sheaves 81, 82 and extends forwardly to a sheave 84 journaled in a bifurcated hanger 85 which is loosely secured by a bolt 86 to the tractor operator's seat 17.

Thus it is evident that the operator of the tractor can rotate the sheave 75, shaft 66 and worm elements 67, 67' by pulling on the chain 83 in one direction or the other without leaving his seat, and thus effecting a simultaneous adjustment of the tension of the springs 52, 52' to increase or decrease the same. The chain 83 is maintained in position trained around the two sheaves 81, 82 by means of a keeper bar 88, which is secured by a bolt 89 to a post 90 formed integrally with the hub 79. The keeper bar 88 extends parallel to the shaft 80 and adjacent the circumferences of the two sheaves 81, 82 and prevents the chain 83 from dropping away from the sheaves.

In the embodiment shown in Figure 1, the control or interconnecting shaft 66 is provided with a universal joint 95 connected to the forward end of the shaft 66 in place of the control sheave 75. A control shaft 96 is connected to the universal joint 95 and extends forwardly and is supported near its forward end in a bearing 97 carried on a standard 98 which is supported on the tubular draft member 12 near the forward end thereof. A crank 99 is provided on the forward end of the control shaft 96 and is located within convenient reach of the operator when seated in the seat 17. Thus, by turning the crank 99 in one direction or the other, the interconnecting shaft 66 is rotated in either direction to increase or decrease the tension in the springs 52, 52'.

It will be noted that the long helical springs 52, 52', when stressed in tension, provide for a generous amount of pivotal movement of the two extension members 32, 33 about their supporting studs 41, 47, respectively. During operation, when the bales are forced outwardly between the upper and lower walls 34, 35, any variations or unevenness in the top and bottom sides of the hay bales may cause a limited amount of vertical floating movement of the extension members 32, 33, but in the range of such movement the variations in the tension of the springs 52 and 52' is negligible.

When crop conditions, such as moisture content or character of the crops, vary during operation sufficiently to make it desirable to adjust the tension in the springs 52, 52', the operator need not stop the tractor and walk back to the bale case to adjust the spring tension, as was necessary heretofore, but merely reaches behind him and adjusts the tension in the two springs, either by pulling the flexible chain 83 or turning the crank 99 as the case may be.

What is claimed is:

1. In a baling press, a bale case including a pair of opposed walls adapted to move toward and away from each other, a pair of spaced springs, means maintaining each of said springs between said opposed walls for urging said walls toward each other, said connecting means including means for adjusting the force exerted by said springs, mechanical means interconnecting said adjusting means providing for simultaneous adjustment of the latter, and a control device extending to a remote position on said press and acting through said interconnecting means for effecting simultaneous adjustment of said springs from said remote position.

2. In a baling press, a bale case including a pair of opposed walls adapted to move toward and away from each other, a pair of spaced springs, means maintaining each of said springs between said opposed walls for urging said walls toward each other, said connecting means including pairs of relatively rotatable threaded members for adjusting the force exerted by said springs, a drive connection between said pairs of members providing for simultaneous adjustment of the latter, and means connected with said drive connection for adjusting said pairs of members simultaneously.

3. In a baling press, a bale case including a pair of opposed walls adapted to move toward and away from each other, a pair of spaced springs, means maintaining each of said springs between said opposed walls for urging said walls toward each other, said connecting means including pairs of relatively rotatable threaded members for adjusting the amount of force exerted by said springs, a drive shaft, gear means connecting said shaft with each of said pairs of members providing for simultaneous adjustment of the latter, and means for rotating said shaft.

4. In a baling press, a bale case including a pair of opposed walls adapted to move toward and away from each other, a pair of spaced springs, means maintaining each of said springs between said opposed walls for urging said walls toward each other, said connecting means including pairs of relatively rotatable threaded members for adjusting the force exerted by said springs, a drive connection between said pairs of members providing for simultaneous adjustment of the latter, said drive connection including a rotatable element, and a flexible endless control member trained around said rotatable element and extending to a remote operator's position providing for adjusting said springs simultaneously from said remote position.

5. In a tractor operated baling press, a bale case including a pair of oppositely disposed walls adapted to move toward and away from each other, a pair of brackets mounted on said walls, respectively, means for applying force to said walls for urging said walls toward each other, said means comprising a long spring acting in tension between said walls, said spring being rigidly connected at one end to one of said pair of brackets and having adjustable means connecting the other end of said spring to the other of said pair of brackets, said other bracket having an opening disposed therein, said adjustable connecting means comprising a threaded rod passing through said opening in said other bracket, a collar element disposed on said rod on one side of said other bracket and a gear element disposed on said rod on the opposite side of said other bracket, said collar element being rigidly fastened to said opposite end of said spring, one of said elements being rigidly fastened to said rod and the other of said elements having threads adapted to engage said threaded rod, whereby rotating said gear element about its axis causes said rod to move axially, thus increasing or decreasing the tensional force applied by said spring, and a control for said adjusting means, said control comprising a shaft supporting bracket, a shaft journaled for rotation in said supporting bracket, and a worm mounted on said shaft and rigidly fastened thereto, said worm being adapted to engage said gear element for rotating the latter.

6. In a tractor operated baling press, a bale case including a pair of oppositely disposed walls adapted to move toward and away from each other, a pair of brackets mounted on said walls, respectively, means for applying force to said walls for urging said walls toward each other, said means comprising a long spring acting in tension between said walls, said spring being rigidly connected at one end to one of said pair of brackets and having adjustable means connecting the other end of said spring to the other of said pair of brackets, said other bracket having an opening disposed therein, said adjustable connecting means comprising a threaded rod passing through said opening in said other bracket, a collar element disposed on said rod on one side of said other bracket and a gear element disposed on said rod on the opposite side of said other bracket, said collar element being rigidly fastened to said opposite end of said spring, one of said elements being rigidly fastened to said rod and the other of said elements having threads adapted to engage said threaded rod, whereby rotating said gear element about its axis causes said rod to move axially, thus increasing or decreasing the tensional force applied by said spring, a control for said adjusting means, said control comprising a shaft supporting bracket, a shaft journaled for rotation in said supporting bracket, and a worm mounted on said shaft and rigidly fastened thereto, said worm being adapted to engage said gear element for rotating the latter, and means adjacent to the tractor seat and operable therefrom for positioning said control during operation of said baler, said positioning means comprising a flexible member trained about said shaft, the latter being rotatable responsive to a pull on said flexible member, and means for holding said flexible member in a position within reach from the seat of the tractor, whereby said control may be positioned from the tractor seat by means of said flexible member, while said baling press is in operative position.

7. In a baling press, a bale case including a pair of oppositely disposed walls adapted to move toward and away from each other, a plurality of pairs of brackets mounted on said walls, one bracket of each of said pairs being mounted on one of said walls and the other bracket of each of said pairs being mounted on said opposite wall, means for applying force to said brackets for urging said walls toward each other, said means comprising a plurality of long springs acting in tension between said brackets, respectively, each of said springs being rigidly connected at one end to one bracket of its associated pair of brackets and having adjustable means connecting the other end of said spring to the other bracket of said associated pair, said other bracket having an opening disposed therein, each of said adjustable means comprising a threaded rod passing through said opening in said other bracket, a collar element disposed on said rod on one side of said other bracket and a gear element disposed on said rod on the opposite side of said other bracket, said collar element being rigidly fastened to said opposite end of said spring, one of said elements being rigidly fastened to said rod and the other of said elements having threads adapted to engage said threaded rod, whereby rotating said gear element about its axis causes said rod to move axially, thus increasing or decreasing the tensional force applied by said spring, and a single control interconnecting said separate adjustable means for simultaneous operation of the latter, said single control comprising a plurality of shaft supporting brackets, a shaft journaled for rotation in said brackets, and a plurality of worms disposed on said shaft and rigidly fastened thereto, said worms being adapted to engage said gear element of said separate adjustable means, respectively, whereby rotating said shaft about its axis rotates all of said adjusting gear element simultaneously through the action of said worms.

8. In a baling press, a bale case comprising a pair of opposed walls movable toward and away from each other, a pair of parallel members secured transversely across said walls, respectively, and extending beyond opposite edges of said walls, a pair of helical springs disposed along opposite sides of said bale case, respectively, and means connecting said springs between adjacent ends of said members, said springs being stressed in tension to urge said walls toward each other and sufficiently long to exert a substantially constant tensional force regardless of minor variations in thickness of the bales passing therebetween.

GEORGE B. HILL.

REFERENCES CITED

The following references are of record in the file of this patent:

UNITED STATES PATENTS

| Number | Name | Date |
|---|---|---|
| 335,290 | La Dow | Feb. 2, 1886 |
| 459,630 | Hampton | Sept. 15, 1891 |
| 549,957 | Coles | Nov. 19, 1895 |
| 568,846 | Griffith | Oct. 6, 1896 |
| 1,496,364 | Bonnafoux | June 3, 1924 |
| 2,038,809 | Tallman | Apr. 28, 1936 |
| 2,173,086 | Dinzl | Sept. 19, 1939 |
| 2,318,229 | Jones | May 4, 1943 |
| 2,396,720 | Nolt | Mar. 19, 1946 |
| 2,411,467 | Russell | Nov. 19, 1946 |
| 2,458,994 | Hill | Jan. 11, 1949 |

FOREIGN PATENTS

| Number | Country | Date |
|---|---|---|
| 749,097 | France | May 2, 1933 |